(12) United States Patent
Jones et al.

(10) Patent No.: US 7,840,561 B2
(45) Date of Patent: Nov. 23, 2010

(54) RETRIEVING HIERARCHICAL DATA

(75) Inventors: Willard B. Jones, Redmond, WA (US); Renee W. Lo, Bellevue, WA (US); Luis A. Angel-Mex, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 11/724,541

(22) Filed: Mar. 15, 2007

(65) Prior Publication Data

US 2008/0114717 A1  May 15, 2008

Related U.S. Application Data

(60) Provisional application No. 60/858,763, filed on Nov. 14, 2006.

(51) Int. Cl.
  *G06F 7/00* (2006.01)
  *G06F 12/00* (2006.01)
  *G06F 17/30* (2006.01)

(52) U.S. Cl. .................. 707/736; 707/741; 707/752; 707/829

(58) Field of Classification Search ............... 707/1–3, 707/100, 102, 687, 694, 696, 711, 736, 741, 707/752, 753, 778, 796, 829, 830
See application file for complete search history.

(56) References Cited

U.S. PATENT DOCUMENTS

| | | | | |
|---|---|---|---|---|
| 6,772,139 | B1* | 8/2004 | Smith, III | 707/748 |
| 6,792,475 | B1* | 9/2004 | Arcuri et al. | 709/245 |
| 2006/0036966 | A1* | 2/2006 | Yevdayev | 715/779 |
| 2008/0028039 | A1* | 1/2008 | Christopher | 709/218 |

* cited by examiner

*Primary Examiner*—Wilson Lee
*Assistant Examiner*—Merilyn P Nguyen
(74) *Attorney, Agent, or Firm*—Merchant & Gould

(57) ABSTRACT

Hierarchical data may be provided. First, first data may be received corresponding to a first item. The first item may correspond, for example, to a web site. Next, a first cache may be created corresponding to an ancestry of the first item. In creating the first cache, information may be included configured to define a hierarchy of the first item. The first item may correspond to a child web site and the information in the cache may correspond to a plurality of parent web sites higher in the hierarchy and being related to the child web site. The first cache may include the plurality of parent web sites in a parent-relative fashion. Then, the received first data corresponding to the first item may be stored in a database. In addition, the first cache may be stored in the database as a property of the stored first item.

15 Claims, 4 Drawing Sheets

*FIG. 3A*

A: *empty*
B: A
C: A ; B
D: A ; B ; C

*FIG. 3B*

A: *empty*
B: /sites/Aardvark,Apple
C: /sites/Aardvark,Apple ; Bear,Banana
D: /sites/Aardvark,Apple ; Bear,Banana ; Coho,Carrot

*FIG. 3C*

A: *empty*
B: /sites/Aardvark,Apple
C: /sites/Aardvark,Apple ; /sites/Aardvark/Bear,Banana
D: /sites/Aardvark,Apple ; /sites/Aardvark/Bear,Banana ; /sites/Aardvark/Bear/Coho,Carrot

RETRIEVING HIERARCHICAL DATA

RELATED APPLICATION

Under provisions of 35 U.S.C. §119(e), Applicants claim the benefit of U.S. Provisional Application No. 60/858,763, filed Nov. 14, 2006, which is incorporated herein by reference.

BACKGROUND

An item may be stored as a row in a database. The item may be related to, at most, one other item, such as a "previous" or "parent" item, identified by information in one of the columns in the item's row. The item's "ancestry" may comprise, for example, the set of items that would be visited by starting from the item and then following the relationships until reaching another item with no such relationship (i.e. a root item of the hierarchy.)

For example, the item may comprise a web site (e.g. collections of web pages.) A designer who designed the pages contained in the web site may wish to display a set of links (i.e. a "breadcrumb") to a set of web sites higher in the overall hierarchy of related web sites. The set of web sites so related to a particular web site may be referred to as the particular web site's "ancestry."

One conventional process to determine an ancestry of an item is to query for each successive parent until reaching a root item. This approach requires one query for each ancestor item. If the number of ancestors for the item is known beforehand, another conventional process to determine the ancestry is to issue a single query making use of multiple table self-joins. There will be one join in the query for each ancestor item. Both of these conventional processes require more work as the depth of an item's ancestry grows. Using the example of a page in a web site, following either conventional processes for each request for the page would not be suitable for a high performance application, especially one with arbitrarily deep item hierarchies. Constructing the query that relies on self-joins may also be difficult because an algorithm may decide on some maximum number of ancestors that may be returned. That is, the query structure (e.g. in terms of the number of self-joins it performs) may be fixed, which may determine how many ancestors may be returned.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Hierarchical data may be provided. First, data may be received corresponding to an item. The item may correspond, for example, to a web site. Next, a cache may be created corresponding to an ancestry of the item. In creating the cache, information may be included configured to define a hierarchy of the item. The item may correspond to a child web site and the information in the cache may correspond to a plurality of parent web sites higher in the hierarchy and being related to the child web site. The cache may include the plurality of parent web sites in a parent-relative fashion. Then, the received data corresponding to the item may be stored in a database. In addition, the cache may be stored in the database as a property of the stored item. Moreover, if the cache for a particular item has been created, or made valid in response to a change in the data held in the cache, a by-product of that work may be that all of its ancestors may also now have a valid cache.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings:

FIGS. 3A through 3C are diagrams each illustrating a cache; and

DETAILED DESCRIPTION

Figure 1:
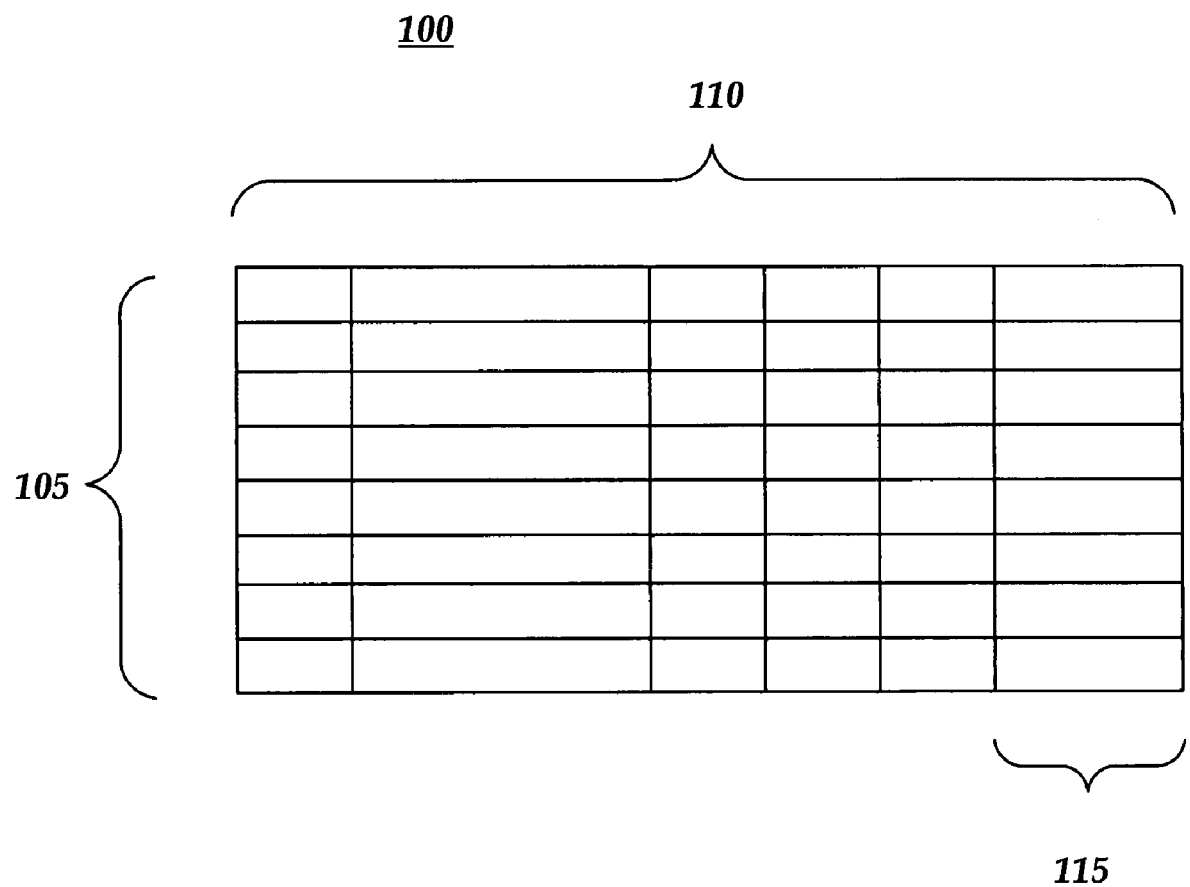
FIG. 1 is a diagram illustrating a database.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Hierarchical data may be provided. Consistent with embodiments of the present invention, an item's ancestry may be stored as one of the item's properties (e.g. an ancestry cache) in a database. In this way, the item's ancestry may not need to be computed for each database request (e.g. query.) FIG. 1 shows a database 100. Database 100 may contain a plurality of rows 105 and a plurality of columns 110. One or more of plurality of columns 110 may be designated as a cache portion 115. A row within plurality of rows 105 may correspond to one item in database 100. An ancestry case for an item corresponding to a particular row may be stored in cache portion 115 corresponding to the particular row. The ancestry cache, for example, may contain all ancestor item properties that may be needed by ancestry consumers. In a service application, for example, the properties may be a small properties subset available on a web site so that, in addition to avoiding repeated queries, the data processed may be greatly reduced. Furthermore, cached data may come from somewhere else, not necessarily from the row representing an ancestor item, whether in another table or another storage system entirely. The object may be the same, for example, to store the related data in the cache so that the system does not have do work on each request.

The properties on an item in database 100 may change. For example, the items stored in database 100 may correspond to, but are not limited to, web sites. In this example, a web site may be given a new title or may be moved to a different uniform resource locator (URL). Consequently, any items that descend from any changed items may also need to be updated so that the ancestry caches (e.g. in cache portion 115) contain correct data. Accordingly, embodiments of the invention may provide a cache structure so that a single query may be sufficient to update an affected row rather than requiring a separate update for each item in the ancestry cache. In other words, embodiments of the invention may support a "breadcrumb" display, as described above, and therefore may refer to items stored as database rows as "web sites," the nearest related item as the "parent", and to the set of related items as the "ancestry," in addition to other terms that arise from the use of the parent-child relationship.

Consistent with embodiments of the invention, the cache corresponding to an item may contain sufficient information to display the item's hierarchy without the need for successive queries for each of the item's ancestor items. Thus the item's ancestry may be efficiently retrieved from database 100. The cache's design may support efficient updates to the descendant items when one or more properties are changed on an item by consistently locating the properties for each item within the cache and by representing each property once in an item's cache. Embodiments of the invention may update the cache, including the initial state, when the cache needs to be computed for the first time or is "too dirty" for an incremental update. In addition, embodiments of the invention may update the cache when the kind of information to be stored in the cache changes.

Figure 2:
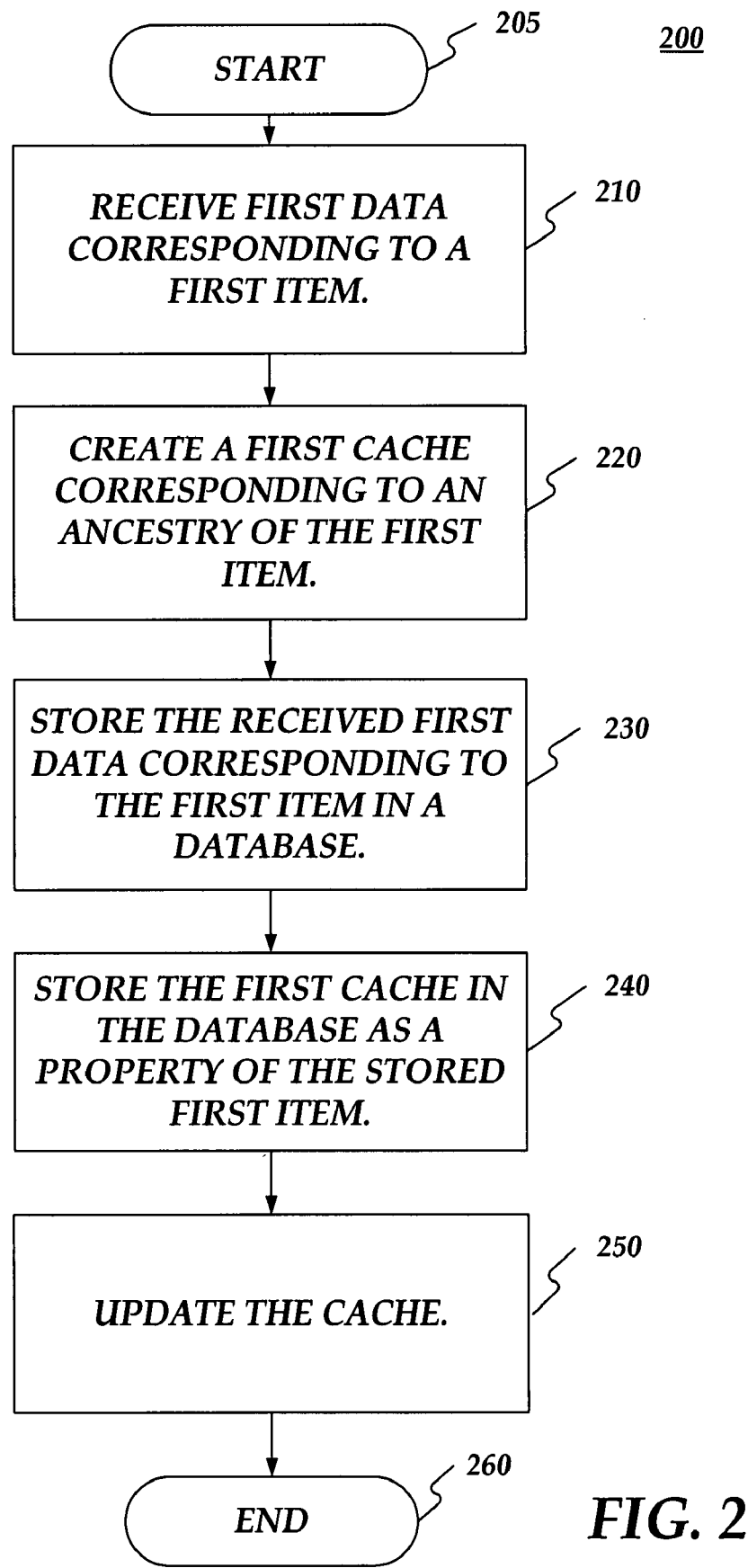
FIG. 2 is a flow chart of a method for providing hierarchical data.

FIG. 2 is a flow chart setting forth the general stages involved in a method 200 consistent with an embodiment of the invention for providing hierarchical data. Method 200 may be implemented using a computing device 400 as described in more detail below with respect to FIG. 4. Ways to implement the stages of method 200 will be described in greater detail below. Method 200 may begin at starting block 205 and proceed to stage 210 where computing device 400 may receive first data corresponding to a first item. For example, the first item may comprise a web site and the received first data may comprise information describing the web site. The information may include, for example, a title for the web site, the URL for the web site, and hierarchical information for parent web sites to the web site.

From stage 210, where computing device 400 receives the first data, method 200 may advance to stage 220 where computing device 400 may create a first cache corresponding to an ancestry of the first item. Information in the first cache may be configured to define a hierarchy of the first item. For example, the cache for a particular web site in database 100 may contain information needed to display each link in a breadcrumb, including among other information, the title and URL of each web site in the breadcrumb. The web sites may appear in the cache in order starting from the root item on down to the web site's parent. For example, for a root web site A (URL: "/sites/Aardvark", Title: "Apple"), which has a child B ("/sites/Aardvark/Bear", "Banana"), which has a child C ("/sites/Aardvark/Bear/Coho", "Carrot"), which has a child D ("/sites/Aardvark/Bear/Coho/Dolphin", "Donut"), the cache contents may appear as shown in FIG. 3A. The semi-colons in FIG. 3A may represent separators that may indicate the end of the cached information for one parent web site, and the beginning of the information for the next parent web site. Note that the information for A may be in the same position for webs B, C, and D, and that B's information may be in the same position in C and D. Also each parent web site's information may be duplicated in each of its descendants' caches. Consequently, this may pose the problem of updating each cache when some web site's information changes.

As shown in FIG. 3B, consistent with embodiments of the invention, no information about a web site may appear more than once within a particular cache. FIG. 3B shows expanding the information in the cache of FIG. 3A with no information about a web site appearing more than once. The semi colons in FIG. 3B may represent separators between the cached properties for a particular web site. Just as each web site appears in the same position for each of its descendants, the information for each site may appear in the same position for each of its cache entries. In particular, this may be relevant when considering the URL that may be cached for each web site. The URLs shown in FIG. 3B may be "parent-relative", that is, they may contain only the difference between a web site URL and its parent's URL. If instead a fuller form of the URL were stored (i.e. not parent-relative), the cache contents may be as shown in FIG. 3C.

An update operation may be performed on the cache. For example, for the cache shown in FIG. 3C, if the URL of A is changed from Aardvark to Anteater, the cache for C may require updates at two positions (the URLs for A and B), while the cache for D may require updates to three positions (the URLs for A, B, and C). Such an update for the cache shown in FIG. 3C may be significantly less efficient than an update to the "single-source" (i.e. "parent-relative") cache design shown in FIG. 3B because the latter update may be described as a change at a single position that may apply to each affected web site.

Furthermore, one problem in choosing a separator may be that it may be difficult to choose a pattern that could not appear in the data itself. Consequently, embodiments of the invention may use the pattern ";#;#" as the separator. A problem, however, may arises from this choice of separator. Consider the example of a web site with a title containing ";#;#". The logic that reads and interprets the cache may misinterpret the data and may produce an incorrect breadcrumb. To solve this problem, consistent with embodiments of the invention, the cached form of any data that resembles the separator may be modified ("escaped") to distinguish it from the separator. At read out of the cache, this modification may be undone so that the original correct data may be restored. Specifically, embodiments of the invention may place an additional semi-colon ahead of each semi-colon found in the data. Doing so may increase the size of the cache, and so, it may be desirable to choose an uncommonly occurring pattern as the separator.

Once computing device 400 creates the first cache in stage 220, method 200 may continue to stage 230 where computing device 400 may store the received first data corresponding to the first item in database 100. For example, computing device 400 may save the received first data in various ones of plurality of columns in one of plurality of rows 105.

After computing device 400 stores the received first data in stage 230, method 200 may proceed to stage 240 where computing device 400 may store the first cache in database 100 as a property of the stored first item. For example, the cache may be stored in one or more of plurality of columns 110 designated as cache portion 115.

From stage 240, where computing device 400 stores the first cache, method 200 may advance to stage 250 where computing device 400 may update the cache. For example, as stated above, such an update for the cache shown in FIG. 3C may be significantly less efficient than an update to the "single-source" (i.e. "parent-relative") cache design shown in FIG. 3B because the cache design shown in FIG. 3B update may be described as a change at a single position that may apply to each affected web site.

Consistent with embodiments of the invention, when a cached property changes on a web site, it may be necessary to update the cache of descendant web sites. This may be done at the time the property is changed. Three pieces of information may be used in the update process: i) which property may be changing to identify the position in the cache where the update will occur; ii) the previous value of the property to determine the amount of data to remove from the cache; and iii) the new value of the property to be inserted into the cache.

If it may not be practical to determine the data and location for the change that may be made in the caches of affected rows, the cache may be emptied in each such row, and the rows may be updated as in the following process:

1) ADD WORK ITEMS
    a) Retrieve cache of parent.
    b) Is it up-to-date?
        i) NO: add item to list and continue from parent with stage (1)
        ii) YES: done adding work items
2) UPDATE WORK ITEMS
    a) Remove the top item from list
    b) Retrieve its parent item's cache, and the information desired from the parent itself
    c) UPDATE the row associated with the current item
    d) Any more items?
        i) YES: continue with stage (1)
        ii) NO: done updating rows If it is desired to store new information in the cache that was previously not stored there, the cache may be cleared from all rows. Then the cache may be updated as above. Once computing device 400 updates the cache in stage 250, method 200 may then end at stage 260.

An embodiment consistent with the invention may comprise a system for providing hierarchical data. The system may comprise a memory storage and a processing unit coupled to the memory storage. The processing unit may be operative to receive first data corresponding to a first item. In addition, the processing unit may be operative to create a first cache corresponding to an ancestry of the first item including information in the first cache configured to define a hierarchy of the first item. Moreover, the processing unit may be operative to store the received first data corresponding to the first item in a database and store the first cache in the database as a property of the stored first item.

Another embodiment consistent with the invention may comprise a system for providing hierarchical data. The system may comprise a memory storage and a processing unit coupled to the memory storage. The processing unit may be operative to determine a current value of a current property and receive a new value for the current property. In addition, the processing unit may be operative to determine a plurality of child items, in a database, having the item as a parent and determine a position corresponding to the current property. The position may be located in a cache portion of the database. The cache portion may be parent-relative. Furthermore, the processing unit may be operative to determine an amount of data to remove based on the current value of the current property. Moreover, the processing unit may be operative to update the database with the new value by, for each of the plurality of child items, remove, at the determined position, the determined amount of data and insert, at the determined position, the new value.

Yet another embodiment consistent with the invention may comprise a system for providing hierarchical data. The system may comprise a memory storage and a processing unit coupled to the memory storage. The processing unit may be operative to create a cache corresponding to an ancestry of a child web site by including information in the cache configured to define a hierarchy of the child web site. The information in the cache may correspond to a plurality of parent web sites higher in the hierarchy corresponding to related web sites. The plurality of parent web sites may be parent-relative. Moreover, the processing unit may be operative to store the received data corresponding to the child web site in a database and store the cache in the database as a property of the stored child web site.

Figure 4:
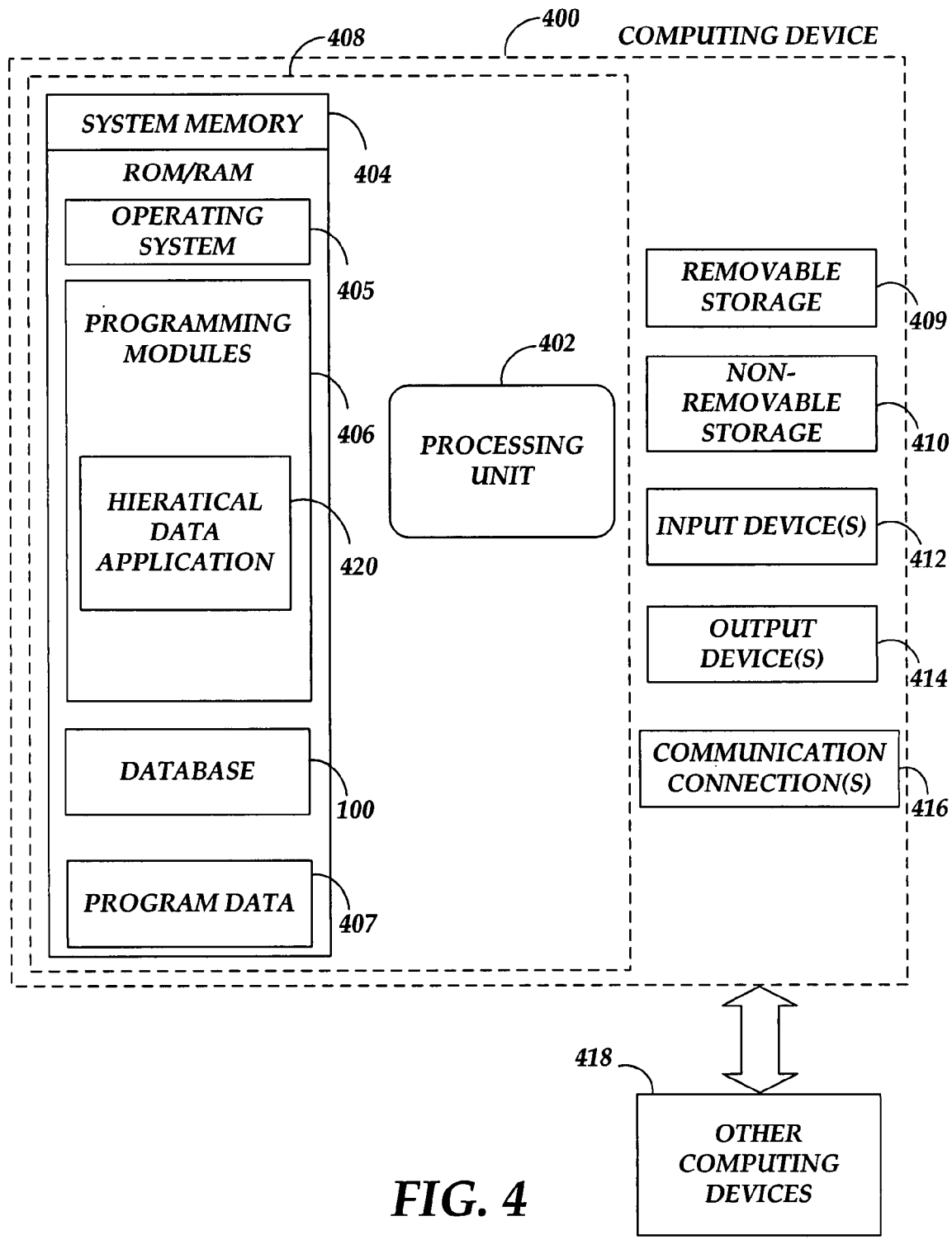
FIG. 4 is a block diagram of a system including a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise an operating environment for database 100 as described above. Database 100 may operate in other environments and is not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may include a program data 407 and database 100. Operating system 405, for example, may be suitable for controlling computing device 400's operation. In one embodiment, programming modules 406 may include a hierarchical data application 420. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g. hierarchical data application 420) may perform processes including, for example, one or more method 200's stages as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A computer readable storage medium having a set of instructions which when executed perform a method for providing hierarchical data, the method executed by the set of instructions comprising:
   receiving data corresponding to an item, wherein receiving the data corresponding to the item comprises receiving the data corresponding to a website;
   creating a cache corresponding to an ancestry of the item, wherein creating the cache corresponding to the ancestry of the first item comprises:
      including information in the cache configured to define a hierarchy of the item,
      creating the cache corresponding to the ancestry of a child web site corresponding to the first item, the information in the cache corresponding to a plurality of parent web sites higher in the hierarchy and being related to the child web site, and
      separating the information in the cache corresponding to the plurality of parent web sites by a unique separator, the unique separator comprising a semicolon;
   storing the received data corresponding to the item in a database having a plurality of rows corresponding to cached items and a plurality of columns corresponding to the information for each of the cached items; and
   storing the cache in the database as a property of the item.

2. The computer readable storage medium of claim 1, further comprising receiving an update to the item, the updated being associated with a relocation of the item.

3. The computer readable storage medium of claim 2, wherein creating the cache comprises creating a cache structure configured to update information stored in the database associated with the updated item with a single query.

4. The computer readable storage medium of claim 3, further comprising updating the database by updating each row associated with the updated item upon receipt of the single query.

5. The computer readable storage medium of claim 1, wherein receiving the data corresponding to the item comprises receiving data corresponding a web site associated with the item.

6. A method for providing hierarchical data, the method comprising:
   receiving data corresponding to an item, wherein receiving the data corresponding to the item comprises receiving the data corresponding to a website;
   creating a cache corresponding to an ancestry of the item, wherein creating the cache corresponding to the ancestry of the first item comprises:
      including information in the cache configured to define a hierarchy of the item,
      creating the cache corresponding to the ancestry of a child web site corresponding to the first item, the information in the cache corresponding to a plurality of parent web sites higher in the hierarchy and being related to the child web site, and
      separating the information in the cache corresponding to the plurality of parent web sites by a unique separator, the unique separator comprising a semicolon;
   storing the received data corresponding to the item in a database having a plurality of rows corresponding to cached items and a plurality of columns corresponding to the information for each of the cached items; and
   storing the cache in the database as a property of the item.

7. The method of claim 6, further comprising receiving an update to the item, the updated being associated with a relocation of the item.

8. The method of claim 7, wherein creating the cache comprises creating a cache structure configured to update information stored in the database associated with the updated item with a single query.

9. The method of claim 8, further comprising updating the database by updating each row associated with the updated item upon receipt of the single query.

10. The method of claim 6, wherein receiving the data corresponding to the item comprises receiving data corresponding a web site associated with the item.

11. A system for providing hierarchical data, the system comprising:
    a memory storage; and
    a processing unit coupled to the memory storage, wherein the processing unit is operative to:
    receive data corresponding to an item, wherein the processing being operative to receive the data corresponding to the item comprises the processing being operative to receive the data corresponding to a website;
    create a cache corresponding to an ancestry of the item, wherein the processing being operative to create the cache corresponding to the ancestry of the first item comprises the processing being operative to:
    include information in the cache configured to define a hierarchy of the item,
    create the cache corresponding to the ancestry of a child web site corresponding to the first item, the information in the cache corresponding to a plurality of parent web sites higher in the hierarchy and being related to the child web site, and separate the information in the cache corresponding to the plurality of parent web sites by a unique separator, the unique separator comprising a semicolon;
    store the received data corresponding to the item in a database having a plurality of rows corresponding to cached items and a plurality of columns corresponding to the information for each of the cached items; and
    store the cache in the database as a property of the item.

12. The system of claim 11, further comprising the processing being operative to receive an update to the item, the updated being associated with a relocation of the item.

13. The system of claim 12, wherein the processing being operative to create the cache comprises the processing being operative to create a cache structure configured to update information stored in the database associated with the updated item with a single query.

14. The system of claim 13, further comprising the processing being operative to update the database by updating each row associated with the updated item upon receipt of the single query.

15. The system of claim 11, wherein the processing being operative to receive the data corresponding to the item comprises the processing being operative to receive data corresponding a web site associated with the item.

* * * * *